United States Patent [19]

Kazmierczak et al.

[11] Patent Number: 4,553,626
[45] Date of Patent: Nov. 19, 1985

[54] SPEED CONTROL MECHANISM FOR A HYDROSTATICALLY DRIVEN VEHICLE

[75] Inventors: Walter Kazmierczak, Colton; Edward M. Assony, Westminster, both of Calif.

[73] Assignee: FMC Corporation, Chicago, Ill.

[21] Appl. No.: 530,831

[22] Filed: Sep. 9, 1983

[51] Int. Cl.⁴ .......................................... B60K 26/00
[52] U.S. Cl. .................................. 180/307; 60/431; 60/468; 60/494; 74/482
[58] Field of Search ............... 180/307, 308, 306, 335; 60/431, 468, 494; 74/482; 417/440

[56] References Cited

U.S. PATENT DOCUMENTS

| | | | |
|---|---|---|---|
| 3,498,156 | 3/1970 | McAllister et al. | 74/879 |
| 3,864,914 | 2/1975 | Timmins | 60/434 |
| 3,943,712 | 3/1976 | Stuhr | 60/431 |
| 3,971,453 | 7/1976 | Patton et al. | 180/306 X |
| 3,978,937 | 9/1976 | Chichester et al. | 180/308 X |
| 4,011,768 | 3/1977 | Tessenske | 180/307 X |
| 4,067,426 | 1/1978 | Murphy | 192/0.098 |
| 4,124,095 | 11/1978 | Ezure | 60/431 X |
| 4,320,673 | 3/1982 | Wegert | 74/865 |

FOREIGN PATENT DOCUMENTS

2402057 8/1975 Fed. Rep. of Germany .
2251711 6/1975 France .

Primary Examiner—Joseph F. Peters, Jr.
Assistant Examiner—Mark C. Dukes
Attorney, Agent, or Firm—A. J. Moore; H. M. Stanley; R. B. Megley

[57] ABSTRACT

A speed control mechanism for a hydrostatically driven vehicle such as a street sweeper is disclosed which includes a selector lever. When the lever is in a variable engine speed position, depression of an accelerator pedal progressively opens the engine throttle from idle speed to high engine speed and progressively closes an inching valve thereby enabling the operator to comfortably drive the vehicle through stop and go traffic. When the lever is in a governor controlled high speed position, the engine throttle is opened and the engine is driven at high speed under control of the governor, and progressive depression of the throttle progressively closes the inching valve thereby providing optimum power while the vehicle is working, such as sweeping streets, with the speed of the vehicle being controlled by the position of the throttle and the position of the inching valve.

25 Claims, 8 Drawing Figures

FIG_5

FIG_6

SPEED CONTROL MECHANISM FOR A HYDROSTATICALLY DRIVEN VEHICLE

CROSS REFERENCE TO RELATED APPLICATION

The present invention is a control improvement of the systems disclosed in Kassai application Ser. No. 497,397 which was filed on May 23, 1983 covering a Hydrostatic Propulsion System and Method With Inching Throttle and Brake, and Kassai application Ser. No. 530,833 filed on Sept. 9, 1983 entitled Hydrostatically Operated Four Wheel Sweeper. Both of these Kassai applications are assigned to the assignee of the present invention, and are incorporated by reference herein.

BACKGROUND OF THE INVENTION

1. Field of the Invention

The present invention relates to speed control mechanisms and more specifically relates to a speed control mechanism which selectively permits the engine speed of a hydrostatically driven vehicle such as a street sweeper to be controlled by an accelerator pedal with the engine speed being between idle speed and a high engine speed when the vehicle is being driven in stop and go traffic; or to retain the engine at high speed while using the accelerator pedal to vary the flow of the hydraulic fluid which changes the speed of the vehicle relative to the ground when using the vehicle to perform its intended function such as street sweeping.

2. Description of the Prior Art

The hydrostatic street sweeper propulsion system disclosed in the cross referenced Kassai applications disclose a hydrostatic propulsion drive system which include a swash plate pump and at least one swash plate motor for driving the rear wheels of the sweeper. A stroking valve is connected to the hydrostatic traction pump and is shifted from a neutral position to a reverse low speed or high speed position as determined by the operator. However, movement of the vehicle will not occur until a hydraulic inching throttle or valve in the hydrostatic system is moved to a partially or fully closed position by the operator in response to depressing an accelerator pedal different amounts.

The engine which powers the hydrostatic pump in the Kassai vehicle is preferably governor controlled to provide an engine speed of about 2700 rpm at all times during operation of the vehicle. It will be appreciated that this high engine speed is objectionable to the operator and wasteful of fuel when the vehicle is driven in stop and go traffic or the like.

SUMMARY OF THE INVENTION

The engine speed control mechanism of the present invention is provided to give the operator the option of maintaining the engine governor controlled at high speed (about 2700 rpm), or controlling the engine speed by the accelerator pedal permitting a variable engine speed range from idle to full speed by depressing the accelerator pedal different amounts. The mechanism includes an operator controlled lever which when placed in an upper position permits the engine speed to vary from idle speed to full speed in response to depressing the accelerator pedal; and a governor controlled position when the lever is placed in its lower position thereby driving the engine at its governor controlled speed, about 2700 rpm.

DESCRIPTION OF THE PREFERRED EMBODIMENT

Figure 6:
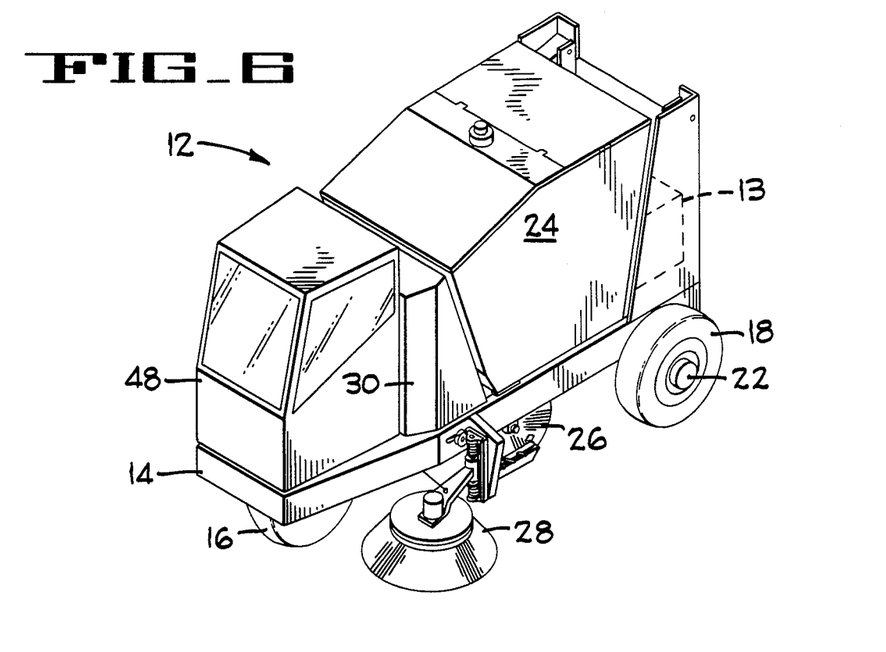
FIG. 6 is a diagrammatic perspective of a street sweeper, taken at a smaller scale, in which the engine speed control mechanism may be used.

The engine speed control mechanism 10 (FIG. 1) of the present invention may be used in a mobile vehicle 12, such as the three wheel street sweeper illustrated in FIG. 6. The vehicle 12 is powered by an engine 13 which drives a hydraulic propulsion system that includes an inching valve 11 (FIG. 1) of the type disclosed in the aforementioned Kassai applications. It will be understood, however, that the invention is not limited to use with street sweepers but may be used in other types of vehicles having similar propulsion systems.

Figure 5:
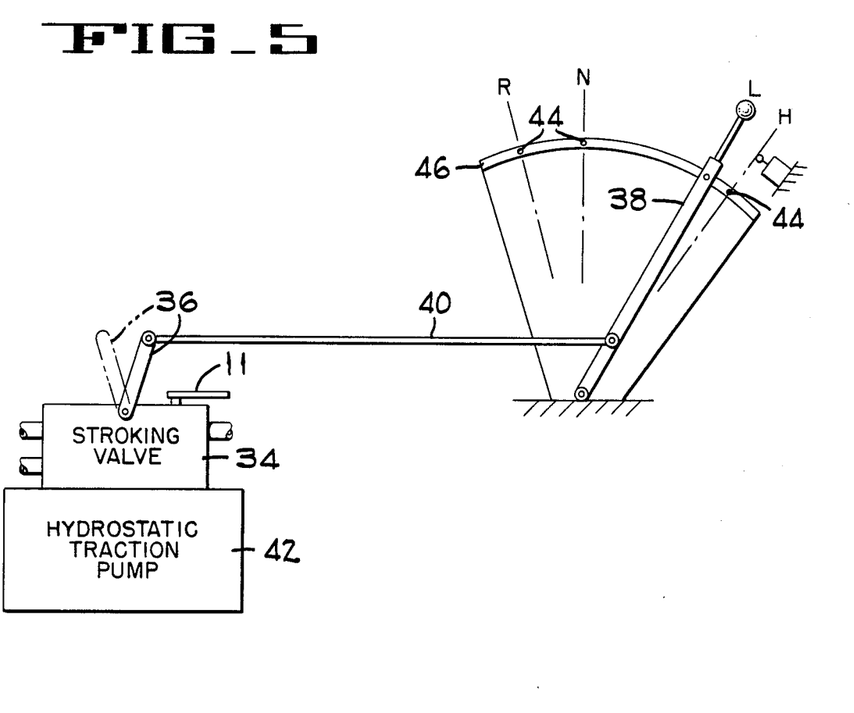
FIG. 5 is an elevation of the prior art stroking valve and its control lever.

The vehicle 12 is illustrated as a street sweeper comprising a chassis 14 mounted on one or more steerable front wheels 16 and two rear wheels 18 (only one being shown) driven at least by one swash plate hydraulic or hydrostatic motor 22. The sweeper includes a hopper 24 which receives debris from a main or pick-up broom 26 and a pair of gutter brooms 28 (only one being shown). The debris swept by the brooms is elevated into the hopper 24 by an elevator (not shown) disposed within the housing 30 for discharge into the hopper 24. The rear wheels 18 are driven by the hydrostatic propulsion system which includes the inching valve 11 (FIG. 1) and a stroking valve 34 (FIG. 5). The stroking valve 34 includes a lever 36 which is connected to a shift lever 38 by a link 40 for movement from a neutral position N into a reverse position R, a low speed position L and a high speed position H. When the shift lever 38 is in its neutral position, the swash plate (not shown) of a hydrostatic traction pump 42 is normal to the axis of rotation of the piston unit of the hydrostatic pump; and when the shift lever 38 is positioned at R, L or H, the swash or wobble plate of the pump is pivoted at different angles relative to its axis of rotation thereby positioned to pump fluid to the motors 22. However, the fluid will not be pumped to the motors until the inching valve 11 is at least partially closed. The lever 38 is retained in its selected position by spring detents 44 in a quadrant 46. The quadrant 46 and shift lever 38 are located in the operator's cab 48 of the vehicle 12.

Figure 1:
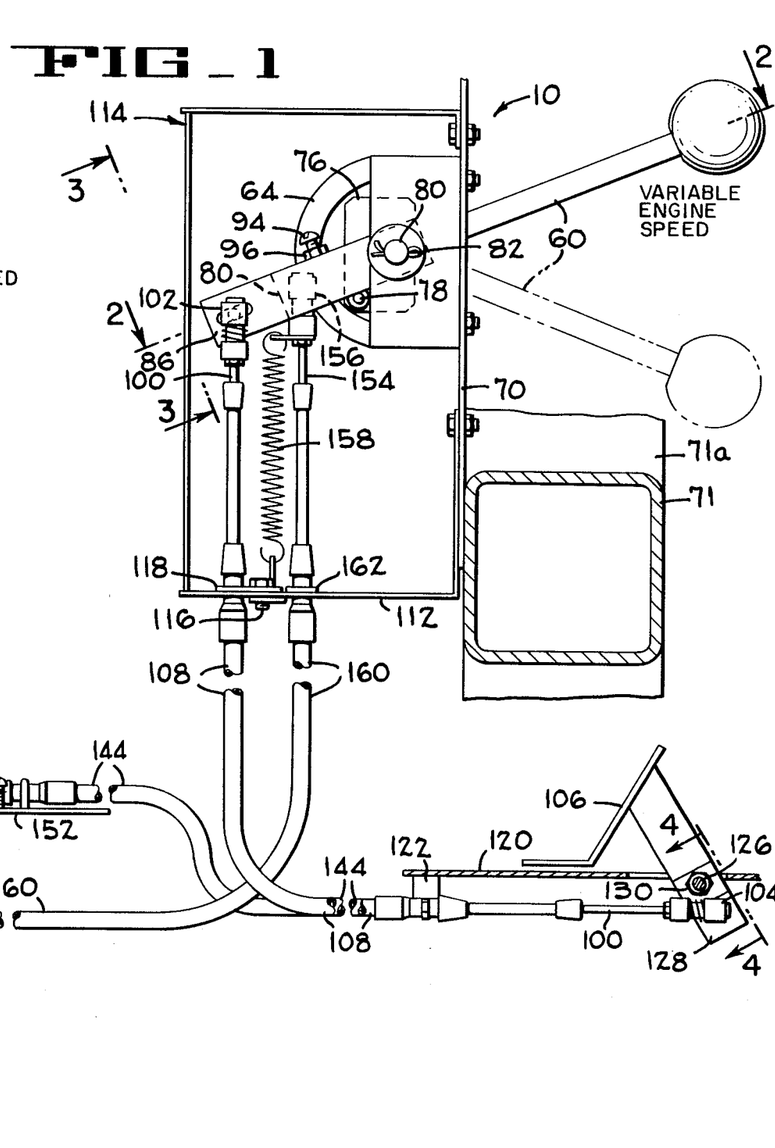
FIG. 1 is a partially diagrammatic side elevation of the engine speed control mechanism of the present invention, certain parts being cut away and the prior art engine throttle and governor being illustrated in elevation while the hydraulic inching valve is diagrammatically illustrated in plan and connected to the mechanism by a sheathed cable.
Figure 1A:
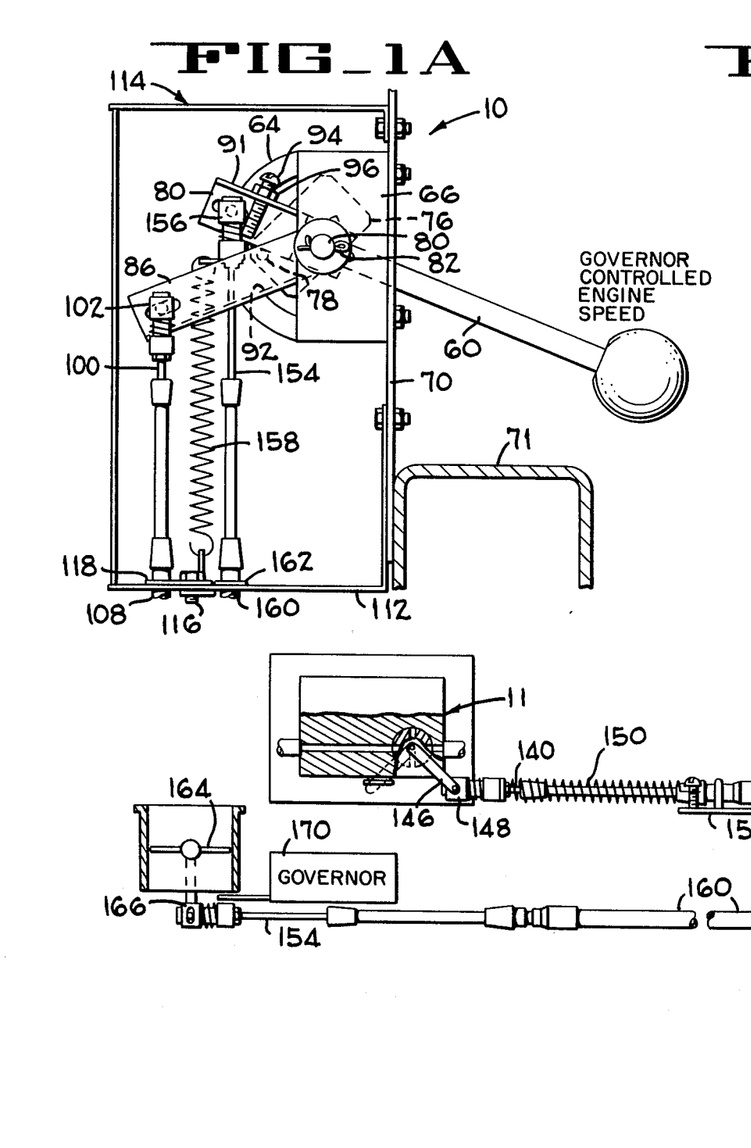
FIG. 1A is an elevation similar to FIG. 1 illustrating a selector lever in a different operative position.
Figure 2:
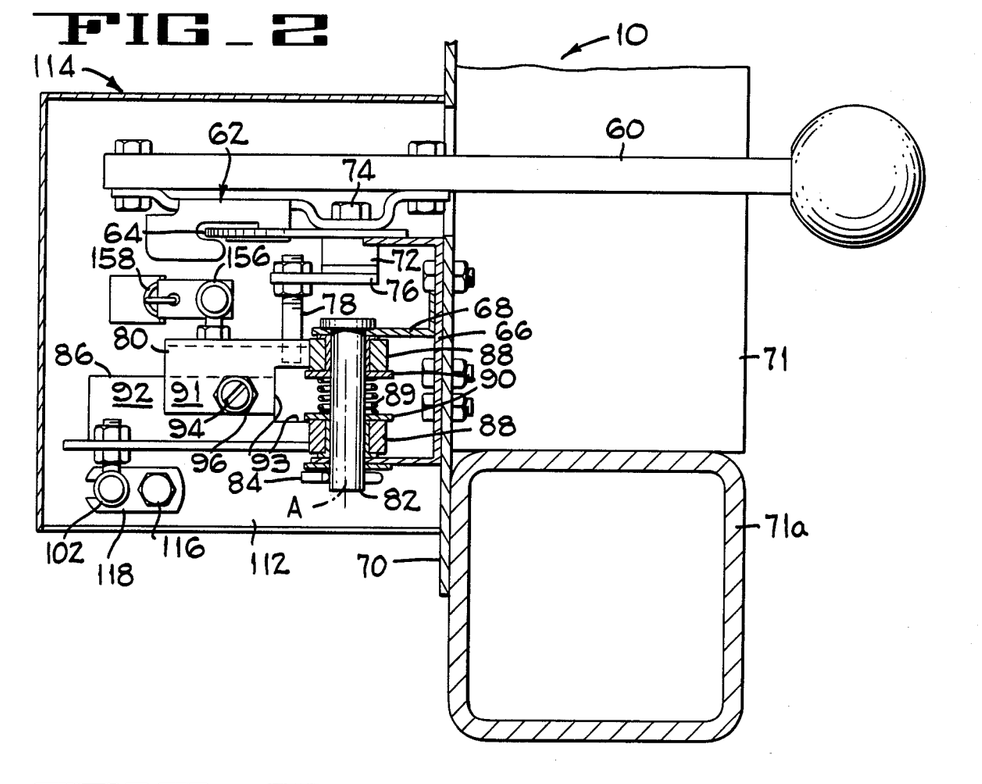
FIG. 2 is a section taken along lines 2—2 of FIG. 1.

Having reference to FIGS. 1, 1A, 2 and 3, the engine speed control mechanism 10 includes a selector lever 60 that is bolted to a hook shaped basic locking unit 62 (FIG. 2) that partially encloses an arcuate quadrant 64 that is bolted to a U-shaped bracket 66 (FIG. 2) having an angle bracket 68 welded thereto. The U-shaped bracket 66 is bolted to the rear wall 70 of the cab 48. The rear cab wall is welded to horizontal and vertical portions 71 and 71a of a rollover bar as shown in FIGS. 1 and 2, respectively. One end of the selector lever 60 projects into the cab 48 (FIG. 1) in position to be easily actuated by the operator of the vehicle.

The hook shaped basic locking unit 62 has a hat shaped bracket 72 rigidly secured thereto by a bolt 74. The ears of the bracket are rigidly secured to a finger mounting plate 76 having a lever actuating finger or bolt 78 secured thereto and extending outwardly therefrom below a first or short pivot arm 80.

When the lever 60 is manually moved between its upper and lower positions illustrated in FIGS. 1, and 1A respectively, the arcuate shaped quadrant 64 cooperates with the basic locking unit 62 to cause the selector lever 60 to be pivoted about an axis A (FIG. 2) of a pivot pin 82 and to thereafter lock itself in selected position.

As best shown in FIG. 2, the pivot pin 82 is mounted in holes in the angle bracket 68 and in one leg of the U-shaped bracket 66. The pin 82 is held in place by a cotter pin 84, and rotatably supports the short arm 80 and a second or long arm 86 having shouldered bushings 88 interposed therebetween. The arms 80 and 86 are urged away from each other by a compression spring 89 and a pair of washers 90 journaled on the pin 82. The effective lengths of the arms 80 and 86 are such that they perform their respective functions in response to pivotal movement of the arms as will be described later.

Figure 3:
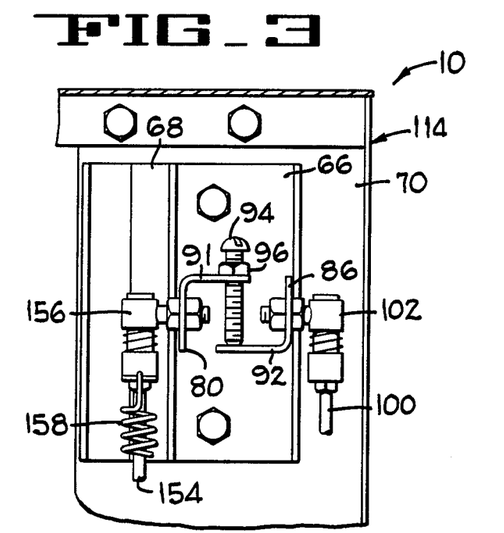
FIG. 3 is a vertical section taken along lines 3—3 of FIG. 1, the pivot pin being removed for clarity.

The arms 80 and 86 (FIGS. 2 and 3) are partially formed from angle stock with the short arm 80 having an upper flange 91 which overlaps a lower flange 92 on the long arm 86. The upper and lower flanges are partially cut away at 93 for clearance. An adjustable screw or lost motion connector means 94 is threaded into the upper flange 91 and is locked in desired position by a locknut 96, which engages the lower flange 92 as shown in FIG. 3.

Figure 4:
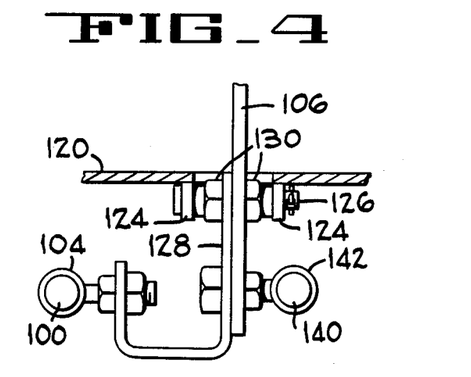
FIG. 4 is an end view of a fragment of the accelerator pedal looking in the direction of arrows 4—4 of FIG. 1 illustrating the points of connection of two sheathed cables.

A first sheathed cable 100 is connected by ball joints 102 and 104 to the long arm 86 (FIG. 1) and to the lower end of an accelerator pedal 106, respectively. The upper end of the sheathing 108 of the cable 100 is anchored to a bottom wall 112 of a housing 114, which enclosed the arms 80 and 86, by a capscrew 116 and a forked plate 118. Similarly, the lower end of the sheathing 108 is connected to the floor 120 of the cab 48 by a double clamp 122. The accelerator pedal 106 is pivotally connected to the floor 120 (FIG. 4) of the cab 48 by any suitable means such as by a pair of apertured ears 124 (FIG. 4) welded to the floor 120 and having a pivot bolt 126 extending therethrough. The pivot bolt 126 also extends through holes in the accelerator pedal 106 and in a U-shaped bracket 128. A pair of nuts 130 are screwed on a threaded portion of the pivot, bolt 126, for locking the pedal 106 to the bracket 128. Other nuts are rigidly connected to the joint 104 to the U-shaped bracket 128 and to the pedal 106 as clearly illustrated in FIG. 4. It will be noted that the accelerator pedal 106 is shaped to receive the heel of the operator's foot and is pushed forward in a clockwise direction (FIG. 1) to increase the speed of the engine 13.

A second, or pedal to inching valve, sheathed cable 140 (FIG. 1) has one end connected to the accelerator pedal 106 by a ball joint 142. The sheathing 144 of the cable 140 is anchored by the double clamp 122 (FIG. 1) to the floor of the cab 120 and to other portions of the vehicle 12 by other clamps (not shown). The other end of the cable 140 is connected to a lever 146 of the inching valve 11 by a ball joint 148. A tension spring 150 connected between the ball joint 148 and a sheathing anchor 152 urges the accelerator pedal 106 towards its illustrated engine idle speed position, and also positions the inching valve in its illustrated open position thereby allowing the hydraulic fluid in the hydrostatic traction pump to freely circulate through the pump thereby providing no power to the hydraulic motors 22 (FIG. 1).

A third (speed control to engine throttle) sheathed cable 154 is connected to the short arm 80 by a ball joint 156 and is urged downwardly by an extension spring 158 connected between the ball joint 156 and the bottom wall 112 of the housing 114. The upper end of the sheathing 160 of the cable 154 is likewise anchored to the bottom wall 112 by a connector 162. The other end of the cable 154 is connected to the throttle 164 of the engine 13 by a ball joint 166 with the throttle being diagrammatically illustrated as a butterfly valve. The sheathing 160 of the throttle cable 154 is anchored to different points on the vehicle by conventional means. A conventional governor 170 (FIG. 1) is located in position to be contacted and placed in speed controlling operation when the throttle is opened to about 2700 rpm.

In operation, it will first be assumed that the operator wishes to drive the vehicle 12 through stop and go traffic. The operator first starts the engine 13 by conventional controls (not shown) and then moves the selector lever 60 (FIG. 1) to the illustrated solid line position in FIG. 1 thereby pivoting the finger 78 (FIG. 2) downwardly causing spring 158 to urge the short arm 80 downwardly. The adjustable abutment screw 94 (FIG. 3) contacts the long arm 86 thereby urging the long arm downwardly. With both arms 80 and 86 in their lowered positions as illustrated in FIG. 1 the three sheathed cables 100, 140 and 154 are in their illustrated positions thereby maintaining the inching valve 11 open and the engine throttle substantially closed as illustrated in FIG. 1 which permits the engine 13 to idle.

Before the operator can drive the vehicle 12, he must move the shift lever 38 (FIG. 5) from the neutral N to reverse R, low L, or high H. Assuming that the operator has placed the lever 38 in the illustrated low speed position, this action pivots the swash plate of the hydrostatic traction pump 42 from its neutral position normal to the axis of rotation of the piston unit of the hydrostatic pump (at which time no hydraulic fluid is pumped) to a position at an acute angle relative to the axis of rotation at which time the pump 42 will pump a small amount of fluid in a forward direction to the hydrostatic motor (or motors) 22. With the engine 13 idling, very little forward driving force is applied to the rear wheels 18 of the vehicle. However, when the operator wishes to drive the vehicle to a different location, he depressed the accelerator pedal 106 which simultaneously moves cable 100 to the left and upwardly, and cable 140 to the left (FIG. 1).

Movement of cable 100 to the left progressively raises both arms 80 and 86 since the long arm 86 is pivoted upwardly by the cable 100 and since upward movement of the long arm 86 is transmitted to the short arm 80 by the adjustment screw 94. Upward movement of the short arm 80 pulls the throttle cable 154 upwardly and to the right (FIG. 1) thereby progressively opening the throttle 164. Thus, progressive clockwise movement of the accelerator pedal progressively increases the speed of the engine 13 and progressively closes the inching valve preventing less hydraulic fluid from flowing from one side to the other side of the hydrostatic traction pump 42 thus directing more fluid to the motor 22 (or motors) which drives the vehicle progressively faster. Release of the accelerator pedal will cause, the springs 150 ahd 158 to progressively open the inching valve and reduce the speed of the engine. Releasing the accelerator pedal 106 will also provide the advantage of hydrostatic braking as described in the first above referred to Kassai application.

Thus, the operator may control both the engines speed and the vehicle speed with only the accelerator pedal, after first placing the lever 38 in the appropriate speed range. This feature allows the operator to drive the vehicle, powered by an engine driven hydrostatic pump and at least one hydrostatic motor, through stop and go traffic with the engine reduced to idle speed when stopped at stop lights or the like. This feature saves fuel and also provides for a much quieter drive through traffic.

When the vehicle 12 is working, such as sweeping streets, it is desirable to have the engine speed at high revolutions per minute and controlled by a conventional governor 170 (FIG. 1). The selector lever 60 is then placed in its lower position shown in dotted lines in FIG. 1 and in full lines in FIG. 1A thereby causing the finger 78 to pivot the short arm 80 upwardly pulling the cable 154 upwardly. Moving the cable 154 upwardly opens the engine throttle 164 sufficiently to provide (and maintain under control of the governor 170) the desired revolutions per minute which is about 2700 rpm in the preferred embodiment. Since the finger 78 does not contact the long arm 86, the spring 150 retains the long arm 86, the cables 100 and 140, the accelerator pedal 106 and the inching valve 11 in their illustrated positions. With the engine 13 controlled by the governor 170 and running at high speed, the operator then moves the shift lever 38 (FIG. 5) into the desired speed range, for example, the low speed range L, and then depresses the accelerator pedal 106. Depressing the accelerator pedal does not affect the engine's speed since the short arm 80 is held in its elevated position by the finger. Depressing the accelerator pedal 106 pushes the long arm 86 upwardly which freely pivots in a clockwise direction since the adjustment screw 94 is in its raised position. Depressing the pedal pushes the cable 140 to the left (FIG. 1) thereby progressively closing the inching valve 11 to drive the vehicle 12 at the desired working speed, within the selected speed range, as determined by the position of the accelerator pedal 106.

Figure 7:
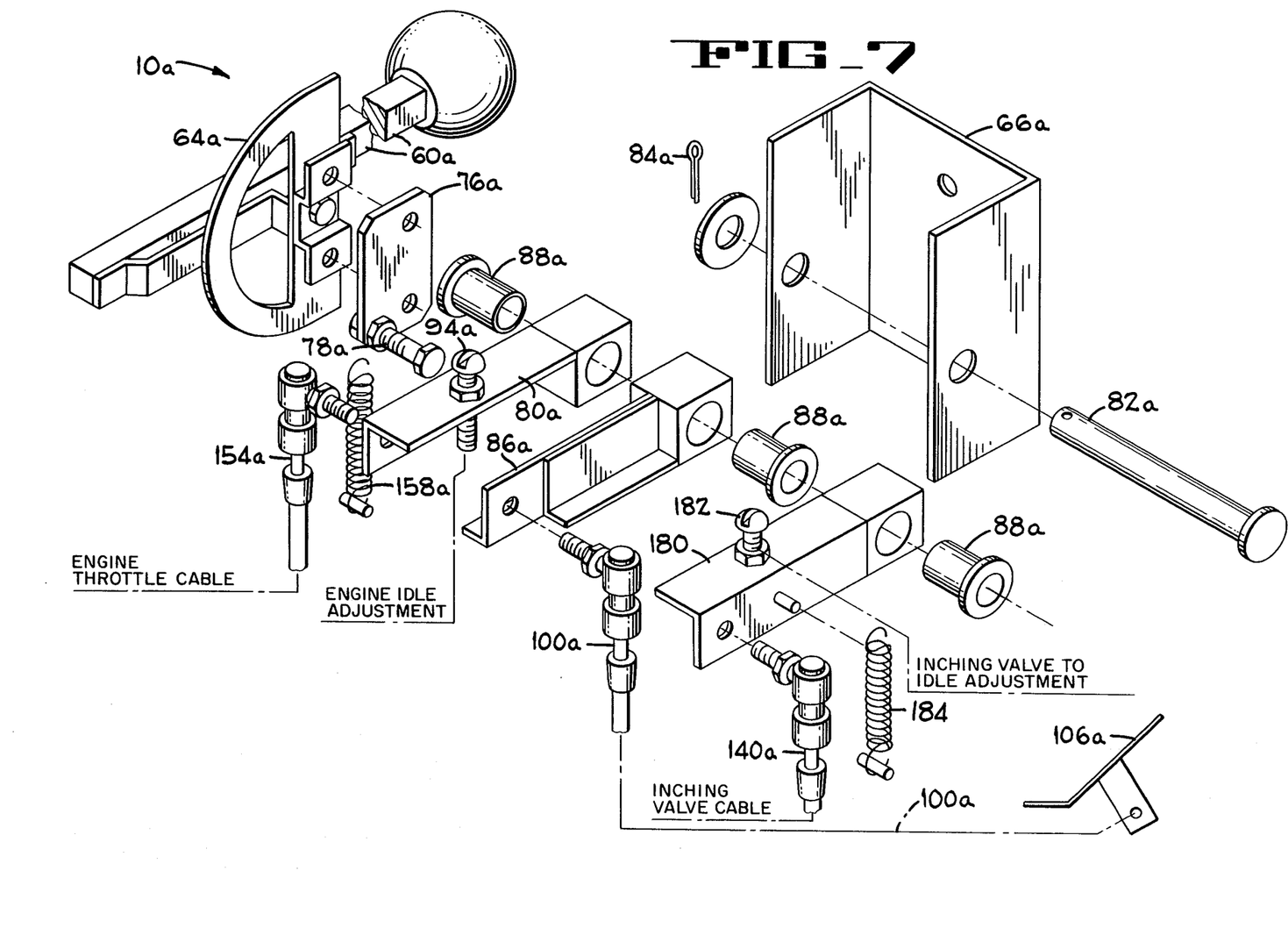
FIG. 7 is an exploded perspective of a portion of a second embodiment of the engine speed control mechanism.

The engine speed control mechanism 10a (FIG. 7) of the second embodiment of the invention is similar to that of the first embodiment except that it adds a third arm 180 and provides a second adjustment screw 182. The two adjustment screws may be adjusted so that the engine speed and hydrostatic motor speed may be adjusted relative to each other to provide an optimum speed balance between the engine and hydrostatic system when both are being controlled by the accelerator pedal.

Since many components of the second embodiment 10a are the same or equivalent to those described in the frrst embodiment. The numerals used to describe the first embodiment will be used followed by the letter "a" to describe equivalent components of the second embodiment.

The speed control mechanism 10a (FIG. 7) includes the selector lever 60a that is pivoted to an arcuate quadrant 64a that is secured to bracket 66a which is rigidly secured to the chassis of the vehicle. The finger 78a is secured to a mounting plate 76a that is secured to and pivots with a selector lever 60a. Arms 80a, 86a and 180 may be defined as first, second and third arms, respectively, and are pivotally supported on a pin 82a which project through bushings 88a in the arms, and holes in a bracket 66a. The pin 82a is held in operative position by a cotter pin 84a and washer. The finger 78a projects below only the throttle arm 80a to pivot the throttle arm upwardly when the selector lever 60a is in its lower governor controlled engine speed position similar to that shown in FIG. 1A. The arm 80a is urged downwardly by a spring 158a and is pivotally attached to the engine throttle by a cable 154a. An engine throttle adjustment screw 94a is adjustably secured to the arm 80a, in position to engage the arm 86a, and the inching valve adjustment screw 182 is adjustably secured to arm 180 and is also in position to contact arm 86a when the selector lever 60a is in its illustrated upper variable engine speed position similar to that illustrated in FIG. 2. Arm 86a is connected to accelerator pedal 106*1* by a cable 100a. The arm 180 is urged downwardly by a spring 184 and is connected to the inching valve 11 (FIG. 1) by a cable 140a.

In operation of the second embodiment of the speed control mechanism 10a, and when the selector lever 60a is in its illustrated raised variable engine speed position, depression of the accelerator pedal 106a will cause cable 100a to pivot the arm 86a upwardly. The throttle adjustment screw 94a will be contacted by the arm 86a and will raise the arm 80a and open the engine throttle 164 (FIG. 1) by means of a cable 154a. Similarly, the inching valve adjustment screw 182 will be contacted by the arm 86a and will raise the arm 180 which progressively closes inching valve 11 by means of the cable 140a.

If the setting of the adjustment screws 94a and 182 are such that it is necessary or desirable to have the engine throttle open more rapidly than the inching valve, the inching valve adjustment screw 182 will be readjusted upwardly. It will be understood that the engine throttle adjustment screw 94a will be adjusted to provide the desired idle speed for the engine 13 (FIG. 1) of the vehicle.

When the selector lever 60a is in its lower governor controlled engine speed position similar to that illustrated in FIG. 1A, only the arm 80a will be raised by the finger 78a thereby opening the engine throttle 164 (FIG. 1) causing the engine to be driven at high speeds under the control of the conventional governor 170. The speed of the vehicle 12 (FIG. 1) will be controlled by depressing the accelerator pedal 106a which will pivotally raise the arm 86a (FIG. 7) by means of the cable 100a and will raise the arm 180 by engagement of the inching valve adjustment screw 182 with the arm 86 thereby progressively closing the inching valve 11 (FIG. 1) by means of the cable 140a.

From the foregoing description it is apparent that the speed control mechanism enables an operator to selectively use the accelerator pedal first for simultaneously varying the engine speed and varying an inching valve in a hydrostatic vehicle drive system between an open and a closed position to controllably drive a vehicle in stop and go traffic; and second, for presetting the engine speed at a governor controlled high speed while using the accelerator pedal only for opening and closing the inching valve thereby providing optimum power when working the vehicle in its intended mode such as sweeping streets.

Although the best mode contemplated for carrying out the present invention has been herein shown and described, it will be apparent that modification and variation may be made without departing from what is regarded to be the subject matter of the invention.

What is claimed is:

1. A speed control mechanism for controlling the throttle of a governor controlled engine and an inching valve of a hydrostatic pump that is operatively connected to at least one hydraulic motor connected to wheel means, the improvement comprising:

a depressible accelerator means movable in a range between engine idle and high speed positions;

selector lever means movable between variable and governor controlled engine speed positions;

first movable arm means operatively connected to the engine throttle, to said selector lever, and to said accelerator means for movement by depressing said accelerator means between an idle and a high engine speed position when said lever is in said variable engine speed position, when said lever is in said governor controlled engine speed position, said first arm means being maintained in said governor speed position and out of operative engagement with said accelerator means; and second movable arm means operatively connected to said accelerator means, the inching valve, and said first arm means;

when said selector lever is in said variable engine speed position, progressive depression of said accelerator means being effective to progressively move said first and second arm means for progressively opening the engine throttle from idle speed to a high speed, and progressively closing said inching valve from an open position to a substantially closed position being. effective to progressively drive said wheel means at higher speeds;

when said selector lever is in said governor speed position, progressive depression of said accelerator means being effective to progressivley close only said inching valve for controlling the speed of said wheel while the engine speed is controlled by the governor.

2. An apparatus according to claim 1 and additionally comprising a third arm means, and wherein the operative connection between said first and second arm means includes said third arm means which is disposed adjacent said second arm means, first cable means operatively connecting said second arm means to said accelerator means which second arm means is disposed between said first and third arm means, second cable means operatively connecting said first arm to said engine throttle, engine throttle adjustment means connected to said first arm means, engine idle adjustment means operatively connected between said first arm means and said second arm means when said selector lever is in said variable engine speed position, third cable means operatively connecting said third arm to said inching valve, and inching valve adjustment means connected between said second arm means and said third arm means.

3. An apparatus according to claim 2 wherein said engine throttle adjustment means is adjusted to provide a desired engine idle speed when the accelerator means is in said idle speed position, said inching valve adjustment means being adjusted to balance the inching valve movement with engine speed changes for optimum operation of the wheel means.

4. An apparatus according to claim 2 wherein said first, second and third arm means and said accelerator means are mounted for pivotal movement.

5. A speed control mechanism for a vehicle powered by an engine having a throttle for driving a hydrostatic propulsion system which includes a pump with an inching valve and swash plate therein controlled by a stroking valve for positioning the swash plate in at least one propulsion speed range for driving a wheel of the vehicle by means of at least one hydrostatic motor, the improvement comprising;

selector lever means pivoted about an axis between a variable engine speed position and a high engine speed position, said selector lever including finger means projecting laterally therefrom;

first arm means mounted for pivotal movement about said axis in position to be contacted by said finger means and be pivoted thereby to a higher engine speed position in response to movement of said lever means into said high engine speed position;

second arm means mounted for pivotal movement about said axis;

lost motion connector means operatively connected to said arms for causing pivotal movement of both of said arms in one direction in response to pivoting said second arm in said one direction, and to pivot only said first arm in said one direction in response to moving said selector lever to said high engine speed position, a depressable accelerator pedal movable in a range between engine idle and engine high speed positions, first connecting means connecting said accelerator pedal to said second arm means, second connector means for connecting said accelerator pedal to said inching valve, third connector means connecting said first arm means to said engine throttle, and means operatively connected to said arms and said accelerator pedal for urging said arms in a direction opposite to said one direction and to urge said accelerator pedal toward said idle speed position.

6. An apparatus according to claim 5 wherein positioning said selector lever means in said variable engine speed position and depressing said accelerator pedal being effective to pivot said first and second arm means as a unit in said one direction for progressively opening said engine throttle from said idle to said high engine speed, and to progressively close said inching valve; positioning said selector lever in said high engine speed position being effective to maintain said engine speed at high speed, and progressively depressing said accelerator pedal being effective to progressively close said inching valve thereby progressively increasing the speed of the vehicle.

7. An apparatus according to claim 5 wherein said first arm is a short arm and said second arm is a long arm, and wherein said lost motion connector is an adjustable screw secured to said short arm and positioned to operatively engage said long arm.

8. An apparatus according to claim 7 wherein said axis is a horizontal axis and wherein said short arm is pivoted upwardly in response to positioning said selector lever in said high speed position.

9. An apparatus according to claim 5 wherein at least one of said first, second and third connecting means are sheathed cables.

10. An apparatus according to claim 6 wherein said first, second and third connecting means are sheathed cables.

11. A speed control mechanism for a vehicle powered by an engine having a throttle for driving a hydrostatic propulsion system which includes a pump with an inching valve and swash plate therein controlled by a stroking valve for positioning the swash plate in at least one propulsion speed range for driving a wheel of the vehicle by means of at least one hydrostatic motor, the improvement comprising:

first arm means mounted for pivotal movement about a predetermined axis, second arm means mounted for pivotal movement about said axis, first abutment means secured to one of said arm means and engaging the other arm means for pivoting both arms as a unit in one direction and for allowing independent pivotal movement of said arms in the opposite direction, selector lever means mounted for pivotal movement about said axis between a variable engine speed position and a governor control high engine speed position, second abutment means secured to said lever means in position to engage and pivot said first arm means to a governor controlled high speed position in response to said selector lever being pivoted into its governor controlled engine speed position and for allowing pivotal movement of said arm means as a unit in said one direction in response to said selector lever means being in said variable speed position, a depressable accelerator pedal movable in a range between engine idle and engine high speed positions, first connecting means connecting said accelerator pedal to said second arm means;

second connecting means for connecting said accelerator pedal to the inching valve, and third connecting means for connecting said first arm means to said engine throttle;

positioning said selector lever means in said variable engine speed position and depressing said accelerator pedal being effective to pivot said first and second arm means as a unit in said one direction for progressively opening said engine throttle from said idle to said high engine speed and to progressively close said inching valve;

positioning said selector lever in said governor controlled engine speed position being effective to maintain said engine speed at high governor speed, and progressively depressing said accelerator pedal being effective to progressively close said inching valve thereby progressively increasing the speed of the vehicle.

12. An apparatus according to claim 11 and additionally comprising resilient means operatively connected to said arms and said accelerator pedal for urging said arms in a direction opposite to said one direction and for urging said accelerator pedal toward said idle position.

13. An apparatus according to claim 11 wherein said first arm is a short arm and said second arm is a long arm, and wherein said first abutment means is an adjustable screw secured to said short arm and operatively engaging said long arm.

14. An apparatus according to claim 13 wherein said second abutment means is a finger secured to said selector lever and disposed in position to engage said first arm to pivot said first arm in said one direction thereby moving said engine throttle to said governor controlled high speed position in response to pivoting said selector lever to said governor controlled high engine speed position.

15. An apparatus according to claim 14 wherein said axis is a horizontal axis and wherein said short arm is pivoted upwardly in response to positioning said selector lever in said governor controlled high speed position.

16. An apparatus according to claim 11 wherein said first, second and third connecting means are sheathed cables.

17. An apparatus according to claim 15 wherein said first, second and third connecting means are sheathed cables.

18. An apparatus according to claim 17 and additionally comprising resilient means operatively connected to said arms and said accelerator pedal for urging said arms in a direction opposite said one direction and for urging said accelerator pedal toward said idle position.

19. A speed control mechanism for a vehicle powered by an engine having a throttle for driving a hydrostatic propulsion system which includes a pump with an inching valve and swash plate therein controlled by a stroking valve for positioning the swash plate in at least one propulsion speed and direction range for driving a wheel of a vehicle by means of at least one hydrostatic motor, the improvement comprising;

a depressible accelerator pedal movable in a range between engine idle and engine high speed, selector lever means movable between variable and governor controlled engine speed positions, first arm means being free to move from a governor controlled engine speed position and to a variable engine speed position in response to said selector lever being placed in said variable engine speed position, second arm means being free to move between a variable engine speed position and a governor controlled engine speed position when said selector lever means is placed in either of said positions in response to movement of said accelerator pedal between said engine idle and engine high speed positions, said second arm means being effective: to move said first arm means from said variable engine speed position to said governor controlled engine speed position, connecting means for connecting said accelerator pedal to said inching valve, connecting means for connecting said accelerator pedal to said second arm means, and a first arm to throttle connecting means for connecting said first arm to said throttle.

20. An apparatus according to claim 19 wherein at least one of said connecting means is a sheathed cable.

21. An apparatus according to claim 19 wherein said selector lever and said first and second arm means are mounted for pivotal movement about a common axis.

22. An apparatus according to claim 19 and additionally comprising resilient means operatively connected to said arms and said accelerator pedal for urging said arm means and said accelerator pedal toward said engine idle speed position.

23. An apparatus according to claim 19 wherein said first arm means is a short arm and said second arm means is a long arm.

24. A speed control mechanism having an accelerator for controlling the throttle of a governor controlled engine and an inching valve of a hydrostatic pump that is operatively connected to at least one hydraulic motor that is connected to wheel means, the improvement which comprises:

accelerator means movable in a range between engine idle and high speed positions;

selector lever means movable between variable and governor controlled engine speed positions;

engine throttle arm means operatively connected to said engine throttle and movable in first and second directions;

means operatively connecting said selector lever means to said engine throttle arm means for urging said engine throttle arm means in said first direction;

accelerator arm means operatively connected to said accelerator and movable in first and second directions;

inching valve arm means operatively connected to said inching valve and movable in first and second directions;

means for supporting each of said arm means for movement;

interconnecting means for interconnecting said engine throttle arm means and said inching valve arm means to said accelerator arm means when moving in said first direction;

engine idle adjustment means operatively and adjustably connected between said engine throttle arm means and said accelerator arm means;

inching valve adjustment means operatively and adjustably connected between said inching valve arm means and said accelerator arm means;

when said selector lever means is moved to a governor controlled high engine speed position, actuation of said accelerator from a low speed to a high speed position being effedtive to move said accelerator arm means and said inching valve arm means in said one direction for progressively closing said inching valve for progressively increasing the speed of said motor; and when said selector lever means is moved to said variable engine speed position actuation of said accelerator from a low speed to a high speed position being effective to move said accelerator arm means, said inching valve arm means and said engine throttle arm means in said first direction for progressively closing the inching valve and opening the throttle for progressively increasing both the engine speed and the hydraulic motor speed.

25. An apparatus according to claim 24 wherein said interconnecting means are adjustable means adapted to be adjusted to provide a desired engine idle speed when the accelerator means is in said idle speed position and to balance the inching valve movement with engine speed changes for optimum operation of the motor.

* * * * *